(12) United States Patent
Kormos et al.

(10) Patent No.: US 7,102,832 B2
(45) Date of Patent: Sep. 5, 2006

(54) METHOD AND APPARATUS FOR MODULATING INFRARED RADIATION

(75) Inventors: Alexander L. Kormos, Fairview, TX (US); Paul D. Felts, Plano, TX (US)

(73) Assignee: L-3 Communications Corporation, New York, NY (US)

( * ) Notice: Subject to any disclaimer, the term of this patent is extended or adjusted under 35 U.S.C. 154(b) by 449 days.

(21) Appl. No.: 10/458,879

(22) Filed: Jun. 10, 2003

(65) Prior Publication Data

US 2004/0184130 A1 Sep. 23, 2004

Related U.S. Application Data

(63) Continuation-in-part of application No. 10/242,842, filed on Sep. 12, 2002, now abandoned.

(51) Int. Cl.
*G02B 9/00* (2006.01)

(52) U.S. Cl. .................. 359/738; 250/232; 378/160

(58) Field of Classification Search .................. 359/738
See application file for complete search history.

(56) References Cited

U.S. PATENT DOCUMENTS

| | | | |
|---|---|---|---|
| 4,742,984 A | 5/1988 | Cote et al. | 248/503.1 |
| 5,055,673 A | 10/1991 | Schneider | 250/233 |
| 5,179,767 A | 1/1993 | Allan | 24/442 |
| 5,282,832 A | 2/1994 | Toso et al. | 606/232 |
| 5,283,932 A | 2/1994 | Richardson et al. | 24/400 |
| 5,949,082 A * | 9/1999 | Schubert et al. | 250/493.1 |
| 6,034,371 A | 3/2000 | Kormos et al. | 250/351 |
| 6,504,661 B1 | 1/2003 | Odille et al. | 359/892 |

FOREIGN PATENT DOCUMENTS

| | | |
|---|---|---|
| EP | 01 843 185 A2 | 11/1997 |
| WO | WO00/34815 | 6/2000 |

OTHER PUBLICATIONS

PCT Notification of Transmittal of The International Search Report and the Written Opinion of the International Searching Authority, or the Declaration dated Oct. 21, 2004 for PCT/US2004/017139.
U.S. Appl. No. 10/242,842, filed Sep. 12, 2002, entitled "Low Profile Snap Fit Fastener," by inventor Paul D. Felts, 28 pages of text and 8 drawing sheets.
"Tredegar Monax$_{Plus}$, Techincal Data Sheet", dated Sep. 17, 1993, Tredegar Film Products, Richmond, Virginia, 2 unnumbered pages.

* cited by examiner

*Primary Examiner*—Jordan M. Schwartz
*Assistant Examiner*—Jessica Stultz
(74) *Attorney, Agent, or Firm*—O'Keefe, Egan & Peterman, LLP

(57) ABSTRACT

A chopper for an imaging system includes a frame and a sheet that have different coefficients of thermal expansion. The frame has a space within it, and has at least one opening that allows radiation to pass through the space. The sheet has structure which influences radiation passing through the sheet, and the sheet is movably disposed within the space in the frame, in a manner so that the sheet can expand and contract relative to the frame in a direction approximately parallel to the sheet. The frame prevents any significant movement of the sheet in a direction transverse to the sheet.

30 Claims, 4 Drawing Sheets ature variations
tend to induce tensile stresses within the film, due in part to
the fact that the film is constrained at its perimeter. As a
result, when the film has been subjected to several cycles of
temperature variation, the tensile stresses often cause the
film to tear, which in turn leads to degradation in the
chopper's performance.

US 7,102,832 B2

METHOD AND APPARATUS FOR MODULATING INFRARED RADIATION

This application is a continuation in part of U.S. Ser. No. 10/242,842 filed Sep. 12, 2002 now abandoned.

TECHNICAL FIELD OF THE INVENTION

This invention relates in general to imaging systems and, more particularly, to a chopper for use in an infrared imaging system.

BACKGROUND OF THE INVENTION

There are infrared imaging systems which have a lens assembly that images incoming infrared radiation onto an infrared detector. As the radiation travels from the lens assembly to the detector, it passes through a rotating chopper, and the chopper modulates the radiation by influencing it in a manner which varies as a result of the rotation of the chopper. For example, the chopper may alternately cause the radiation passing through it to be diffused to effect blurring, and permit the radiation to pass through it without any significant change.

One existing type of chopper has a frame that supports a polymer film. The polymer film has different portions which respectively include and are free of diffusion structure. Rotation of the chopper causes these portions to influence radiation passing through the chopper in an alternating manner. The film is a polymer material which is processed so that the polymer chains have a generally random orientation. The random orientation of the polymer chains has the effect of softening the material of the film to a point where, in order to keep the film flat, the film must be constrained to the frame at its perimeter, and then stretched taut within the frame. While existing choppers of this type have been generally adequate for their intended purposes, they have not been satisfactory in all respects.

For example, systems using this type of chopper are often expected to operate in a satisfactory and reliable manner across a relatively wide operational temperature range. However, the frame and the film have different coefficients of thermal expansion. As a result, temperature variations tend to induce tensile stresses within the film, due in part to the fact that the film is constrained at its perimeter. As a result, when the film has been subjected to several cycles of temperature variation, the tensile stresses often cause the film to tear, which in turn leads to degradation in the chopper's performance.

SUMMARY OF THE INVENTION

From the foregoing, it may be appreciated that a need has arisen for a method and apparatus for modulating radiation, in which a chopper can undergo many variations in temperature without experiencing physical damage and/or degraded performance. One form of the invention involves: providing a frame which has a first coefficient of thermal expansion, which has a space therein, and which has openings that allow radiation to pass through the space in a first direction; providing a sheet which has a second coefficient of thermal expansion different from the first coefficient of thermal expansion, and which includes structure that influences radiation passing through the sheet in the first direction; and responding to temperature changes by causing the sheet to undergo at least one of expansion and contraction relative to the frame within the space in a second direction approximately parallel to the sheet and approximately perpendicular to the first direction, the frame preventing significant movement of the sheet parallel to the first direction with respect to the frame.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
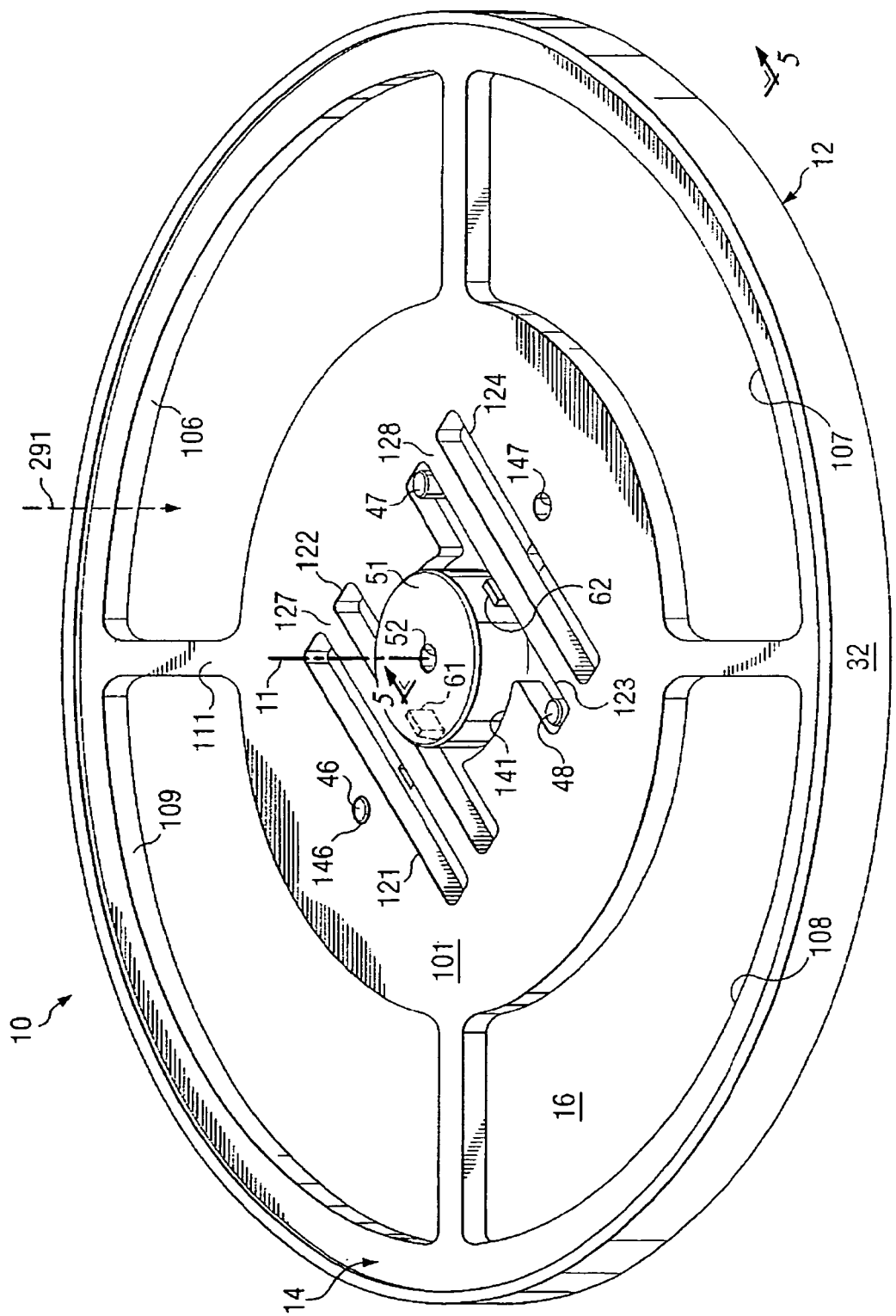
FIG. 1 is a diagrammatic perspective view of an apparatus which is a chopper that embodies aspects of the present invention.

FIG. 1 is a diagrammatic perspective view of an apparatus which is a chopper 10. The chopper 10 embodies aspects of the present invention, and is configured for use in a not-illustrated infrared imaging system of a known type. In the infrared imaging system, the chopper 10 is rotated about an axis of rotation 11 by a not-illustrated motor. The chopper 10 influences infrared radiation traveling from a lens assembly of the system to an infrared detector of the system, as discussed later. References in the following discussion to specific directions, such as up and down, relate to the orientation of the chopper 10 as it is shown in the accompanying drawings. It will be recognized that, when used in an imaging system, the chopper 10 could have any convenient orientation.

The chopper 10 includes a lower frame part 12, an upper frame part 14, and an approximately circular sheet of polymer film 16 disposed between the frame parts 12 and 14. The frame parts 12 and 14 together define a frame. The frame parts 12 and 14 and the film 16 are each discussed separately below in more detail.

Figure 2:
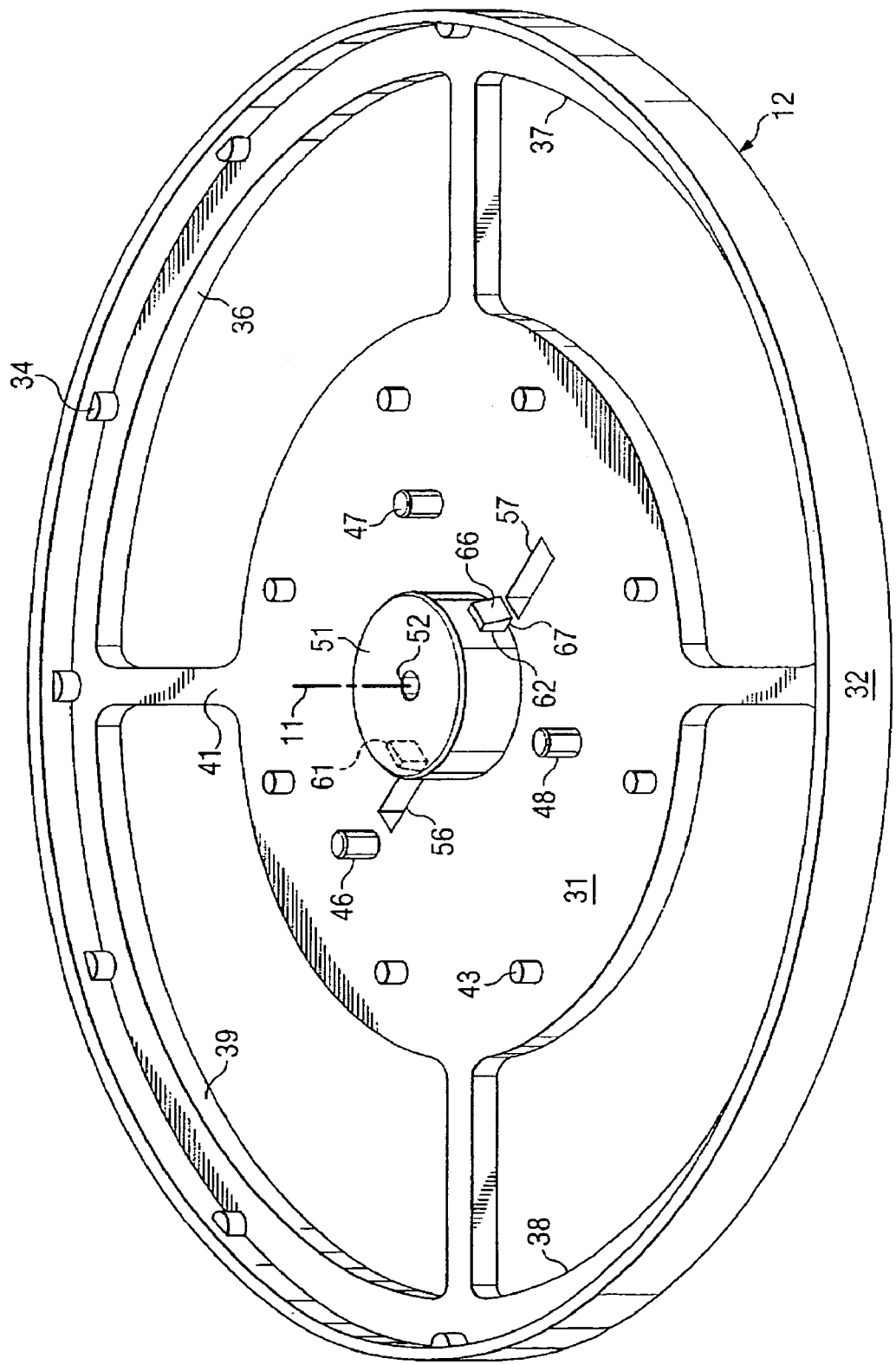
FIG. 2 is a diagrammatic perspective view of a lower frame part, which is a component of the chopper of FIG. 1.

More specifically, FIG. 2 is a diagrammatic perspective view of the lower frame part 12. The lower frame part 12 has a circular main wall 31 which is perpendicular to the axis of rotation 11, and which has a circular perimeter that is concentric with the axis of rotation 11. The lower frame part 12 has a cylindrical side wall 32, which is fixedly secured to and projects upwardly from the peripheral edge of the main wall 31. The frame part 12 has twelve outer spacing protrusions 34, which are equally angularly spaced. Each protrusion 34 is semi-cylindrical, has an axis which extends parallel to the axis 11, has a lower end disposed at the main wall 31, and has a flat side disposed at the main wall 32. Each protrusion 34 projects upwardly from the main wall 31 and inwardly from the side wall 32, and has a vertical height which is less than the vertical height of the side wall 32.

The frame part 12 has, a short radial distance inwardly from the protrusions 34, four openings 36-39 which are offset about the axis 11 by equal angular intervals, and which each have an approximately arcuate shape. The openings 36-39 are separated by respective thin radial spokes, one of which is identified by reference numeral 41. The frame part 12 also has, a short radial distance inwardly from the openings 36–39, eight inner spacing protrusions 43 which project upwardly from the main wall 31, and which are offset about the axis 11 by equal angular intervals. Each protrusion 43 has an approximately cylindrical shape, extends approximately parallel to the axis 11, and has one end disposed at the main wall 31. Each protrusion 43 has a height which is less than the height of the side wall 32.

The frame part 12 has, at the center of the main wall 31, a cylindrical hub 51 which projects upwardly from the top surface of the main wall 31. The hub 51 is concentric to the axis 11, and has extending through it a central cylindrical opening 52, which is also concentric to the axis 11. The opening 52 can receive the shaft of the not-illustrated motor that can effect rotation of the chopper 10.

Two approximately rectangular openings 56 and 57 are provided through the main wall 31 on diagrammatically opposite sides of the hub 51. Two hook elements 61 and 62 are fixedly supported on diametrically opposite sides of the hub 51, and each project outwardly over a respective opening 56 or 57. Each hook element has on the bottom side thereof an approximately horizontal retaining surface, one of which is designated by reference numeral 67, and also has an inclined side surface, one of which is designated by reference numeral 66.

The frame part 12 also has, a short radial distance inwardly from the protrusions 43, three cylindrical alignment posts 46–48, which each project upwardly from the main wall 31, in a direction parallel to the axis 11. The posts 46–48 are offset about the axis 11 by equal angular intervals.

In the disclosed embodiment, the lower frame part 12 is a single integral part which is fabricated in its entirety from a 40% glass-filled polyphenylene material using injection molding techniques of a known type. However, the frame part 12 could alternatively be made in any other suitable manner, and could be made of any other suitable material or materials.

Figure 3:
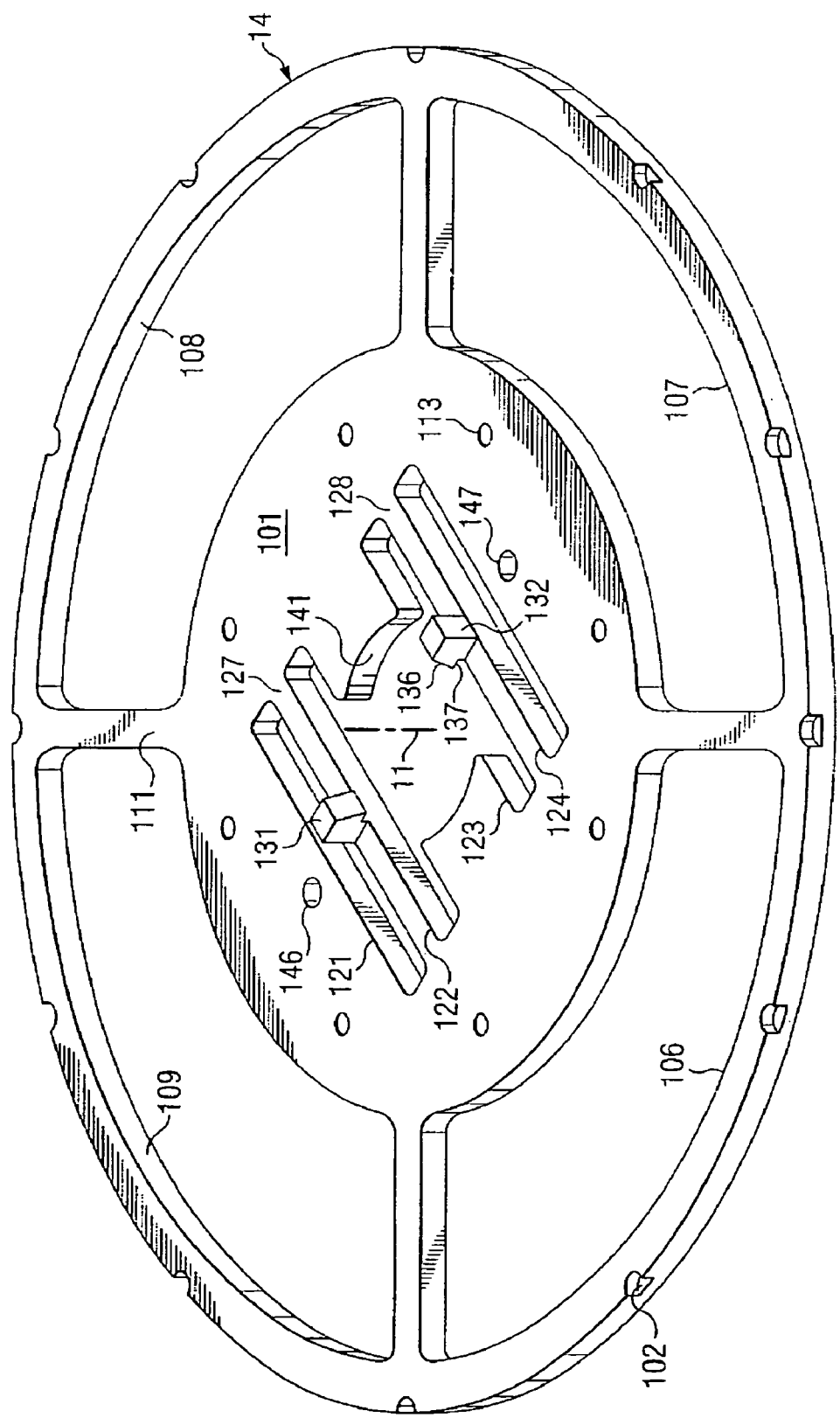
FIG. 3 is a diagrammatic perspective view of an upper frame part which is a component of the chopper of FIG. 1, but which is shown in FIG. 3 in an inverted orientation.

FIG. 3 is a diagrammatic perspective view of the upper frame part 14, in an orientation which is inverted from the orientation shown in FIG. 1. In other words, the upper frame part 14 is upside down in FIG. 3, so that the bottom side of the frame part 14 faces upwardly. The upper frame part 14 includes a circular main wall 101, which is perpendicular to the axis of rotation 11, which has a circular perimeter that is concentric to the axis of rotation 11, and which has an outside diameter that is slightly less than the inside diameter of the cylindrical side wall 32 on the lower frame part 12.

The frame part 14 has twelve recesses or indentations 102 provided in the underside of the main wall 101, at equally angularly spaced intervals along the periphery thereof. Each of the recesses 102 has an approximately semi-cylindrical shape, with an axis extending parallel to the axis 11. Each of the recesses 102 has a depth which is approximately one-half the thickness of the main wall 101. The frame part 14 also has, a short radial distance inwardly from the recesses 102, four openings 106–109 which are offset by equal angular intervals about the axis 11, and which each have an approximately arcuate shape. Between each adjacent pair of the openings 106–109 is a thin radial spoke, one of which is designated by reference numeral 111.

The frame part 14 has, a short radial distance inwardly from the openings 106–109, eight circular recesses or indentations 113, which each have an axis extending parallel to the axis 11, and which are offset about the axis 11 by equal angular intervals. The recesses 113 each have a depth which is approximately one-half the thickness of the main wall 101.

The central portion of the main wall 101 has four parallel slots 121–124, which each extend completely through the main wall 101. The slots 121 and 122 are adjacent and disposed on one side of the axis 11, and the slots 123 and 124 are adjacent and disposed on the other side of the axis 11. The main wall 101 has a portion 127 which is disposed between and separates the slots 121 and 122, and which serves as a beam that has a degree of resilient flexibility. In a similar manner, a beam 128 is provided between the slots 123 and 124, and has a degree of resilient flexibility.

At the center of each of the beams 127 and 128 is a respective hook element 131 or 132, which projects downwardly from the associated beam (upwardly in FIG. 3, since the frame part 14 is shown upside down). Each of the hook elements 131 and 132 has a portion which projects radially inwardly beyond the edge of the adjacent slot 122 or 123, which has an upwardly facing retaining surface thereon (one of which is indicated at 137), and which has an inclined side surface thereon (one of which is indicated at 136).

The main wall 101 has in the center thereof an opening 141 which is approximately cylindrical, except that it communicates on diametrically opposite sides with center portions of each of the two slots 122 and 123. The opening 141 is concentric to the axis 11, and has a diameter which is slightly greater than the diameter of the hub 51 on the frame part 12 (FIG. 2). The main wall 101 has two cylindrical alignment openings 146 and 147 extending completely therethrough. The alignment openings 146 and 147 are disposed on diametrically opposite sides of the axis 11, and are each disposed slightly radially outwardly from a respective one of the slots 121 and 124.

In the disclosed embodiment, the upper frame part 14 is a single integral part which is fabricated in its entirety from a 40% glass-filled polyphenylene material using injection molding techniques of a known type. However, the upper frame part 14 could alternatively be made in some other suitable manner, and could alternatively be made from some other suitable material or materials.

Figure 4:
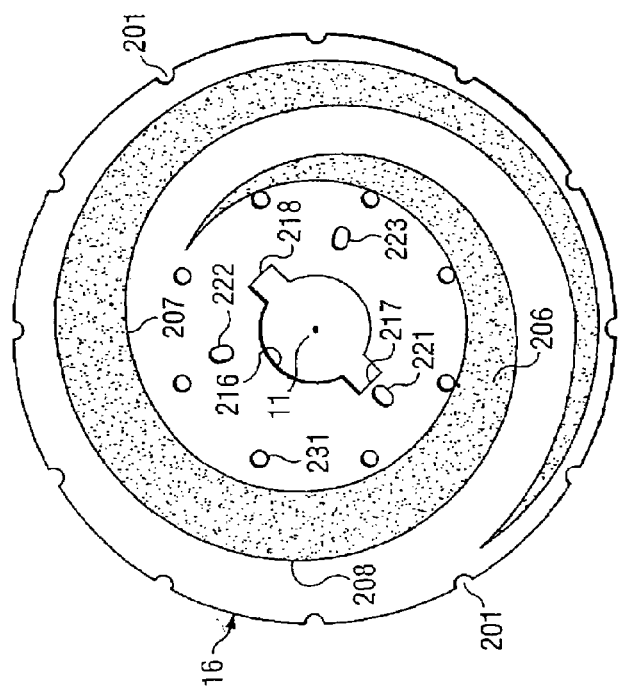
FIG. 4 is a diagrammatic top view of a polymer film, which is a component of the chopper of FIG. 1.

FIG. 4 is a diagrammatic top view of the film 16. The film 16 is an approximately circular piece of sheet-like material, with an outside diameter which is somewhat less than the inside diameter of the cylindrical side wall 32 on the lower frame part 12. In the disclosed embodiment, the film 16 is made from a known polymer material which is a high-density polyethylene. Applicants used a high-density polyethylene material obtained commercially under the tradename MONAX, type HD-A, from Tredegar Film Products of Richmond, Va. However, the film 16 could alternatively be made from any other suitable material, such as a material having the same infrared transmittance and mechanical properties. In the disclosed embodiment, the film has a thickness of approximately 0.002 inch, and the material of the film 16 has a high degree of orientation of its polymer chains, which in turn causes the film 16 to be some what stiffer than would be the case if the polymer chains had a random orientation.

The film 16 has twelve approximately semi-circular recesses 201 provided along the periphery thereof, at equally angularly spaced locations. Each of the recesses 201 has a diameter which is somewhat greater than the diameter of the protrusions 34 (FIG. 2) on the lower frame part 12. The radially outer half of the film 16 has an embossed portion 206, which is bounded on its opposite sides by respective curves 207 and 208 that are each an Archimedes spiral, where the Archimedes spirals are 180° out of phase with each other. The embossed portion 206 has a pre-defined pattern, which includes a plurality of small defractive optical elements (DOEs). Infrared radiation which passes through the embossed portion 206 is diffused and thus blurred, in a known manner. In contrast, infrared radiation which passes through other portions of the film 16 is not subjected to diffusion or blurring. For clarity, the embossed portion 206 of the film 16 is not specifically depicted in FIG. 1.

The film 16 has at the center thereof an approximately circular opening 216 which is concentric to the axis 11. The opening 216 has a diameter which is somewhat greater than the diameter of the hub 51 on the lower frame part 12 (FIG. 2). The opening 216 has two extensions 217 and 218 which extend radially outwardly from diametrically opposite sides thereof, and which each have an approximately rectangular shape. The film 16 has three slots 221–223 which are located a short radial distance outwardly from the opening 216 and the extensions 217-218. The slots 221-223 each extend completely through the film 16, each extend approximately radially, and are offset from each other about the axis 11 by equal angular intervals. The slot 221 is angularly aligned with the extension 217. The slots 221–223 each have a width which is slightly larger than the diameter of the posts 46–48 (FIG. 2) on the lower frame part 12.

The film 16 also has, a short radial distance outwardly from the slots 221–223, eight cylindrical openings 231, which each extend completely through the film 16, and which are offset about the axis 11 by equal angular intervals. Each of the openings 231 has a diameter which is somewhat greater than the diameter of the inner spacing protrusions 43.

Figure 5:
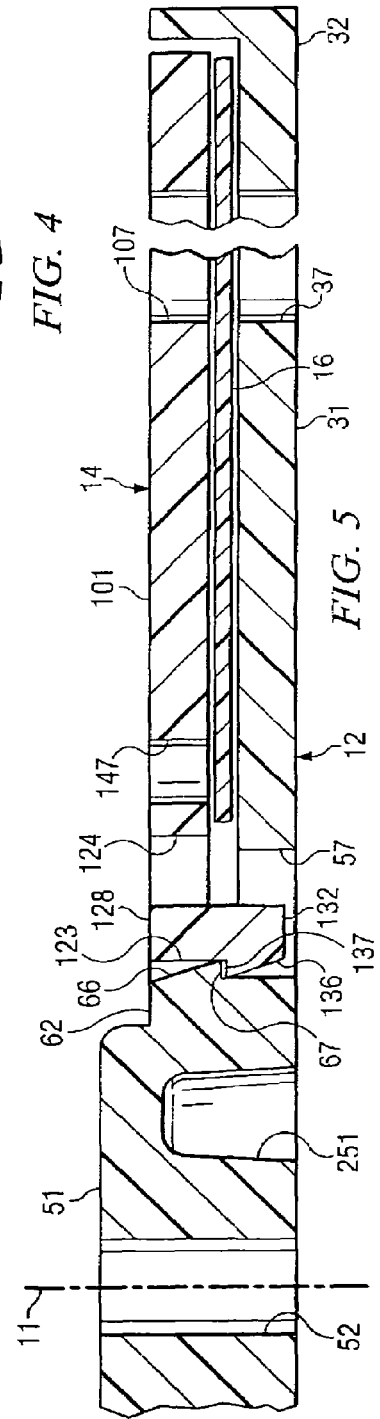
FIG. 5 is a diagrammatic fragmentary sectional view taken along the section line 5—5 in FIG. 1.

FIG. 5 is a diagrammatic fragmentary sectional view taken along the section line 5—5 in FIG. 1. It will be noted from FIG. 5 that an annular recess 251 is provided in the underside of the hub 51, concentric to the axis 11. The recess 251 is provided to reduce the amount of plastic material present in the hub 51, and thus the cost of the frame part 12, and is also provided to ensure that the plastic material of the hub 51 cures rapidly and uniformly while it is in the injection mold.

With reference to FIGS. 1 and 5, the chopper 10 is assembled by placing the film 16 into the lower frame part 12 above the main wall 31 thereof, in a manner so that the hub 51 projects upwardly through the opening 216, the extensions 217 and 218 are respectfully disposed above the openings 56 and 57, the posts 46–48 each extend through a respective slot 221–223, the protrusions 43 each extend through a respective opening 231, and the recesses 201 each receive a respective protrusion 34.

The recesses 201 and openings 231 are oversized with respect to the protrusions 34 and 43, so that the protrusions 34 and 43 do not engage the film 16 in any way that would serve to limit movement of the film 16 with respect to the lower frame part 12. Similarly, the outer diameter of the film 16 and the diameter of its central opening 216 are selected so that the film 16 does not engage either the side wall 32 or the hub 51 of the frame part 12 in a manner that would limit relative movement of the film 16 and the frame part 12. As mentioned above, the radial slots 221–223 are each only slightly wider than the corresponding post 46–48. As a result, cooperation of the posts 46–48 with the slots 221–223 serves to maintain the film 16 in proper angular and radial alignment with respect to the lower frame part 12.

After the film 16 has been properly positioned in this manner within the lower frame part 12, the upper frame part 14 is moved vertically downwardly into engagement with the lower frame part 12. As this occurs, the upper frame part 14 is oriented so that the openings 36–39 are respectively aligned with the openings 106–109, the post 46 is aligned with and moves into the opening 146, the posts 47 and 48 are aligned with and move into opposite ends of the slot 123, hook elements 61 and 62 are aligned with and respectively move into slots 122 and 123, and hook elements 131–132 are aligned with and respectively move into the openings 56 and 57.

As the upper frame part 14 moves toward the lower frame part 12, the inclined surface 66 on the hook element 62 engages the inclined surface 136 on the hook element 132, causing the beam 128 to flex outwardly a small amount as the hook elements 62 and 132 move past each other, until the resilience of the beam 128 can return the beam 128 to its original position, with the hook elements 66 and 132 engaged in the manner shown in FIG. 5. In this position, the horizontal surfaces 67 and 137 on these hook elements face and engage each other, in order to prevent relative axial movement that would separate the frame parts 12 and 14. At the same time that the hook elements 66 and 132 are moving into cooperating engagement in this manner, the other two hook elements 61 and 131 are moving into cooperating engagement in a similar manner. After this engagement is completed, the hook elements 61–62 and 131–132 effectively define a form snap-fit coupling that reliably couples the frame parts 12 and 14 to each other, without any need for separate fasteners that would add to the effective cost of the chopper.

As the upper frame 14 is moved downwardly toward the lower frame part 12 in the manner explained above, the protrusions 34 on the frame part 12 each move into a respective one of the recesses 102 in the frame part 14, and the protrusions 43 on the frame part 12 each move into a respective recess 113 in the frame part 14. When the hook parts 61–62 and 131–132 have become fully engaged in the manner discussed above, the upper end of each protrusion 34 will be urged against the inner end of the associated recess 102, and the upper end of each protrusion 43 will be urged against the inner end of the associated recess 113. This engagement between the protrusions 34 and 43 and the recesses 102 and 113 ensures that the facing surfaces of the main walls 31 and 101 of the frame parts 12 and 14 will be maintained in a position where there is a predetermined axial space therebetween (see FIG. 5). In the disclosed embodiment, this axial space between the frame parts 12 and 14 is about 0.005 inch. As discussed above, the film 16 has a smaller thickness, which is about 0.002 inch. Consequently, the film 16 is not pinched between the facing surfaces of the frame parts 12 and 14 in a manner which would limit or restrict movement of the film 16 relative to the frame parts. Therefore, in directions parallel to the plane of the film 16, the film 16 can effectively float with respect to the frame parts 12 and 14, except to the extent that relative movement is limited by cooperation of the posts 46–48 with the slots 221–223.

When the chopper 10 is installed in an infrared imaging system, a not-illustrated motor of the system effects rotation of the chopper 10 about the axis of rotation 11. Infrared radiation travels along a path shown diagrammatically at 291 in FIG. 1, as it propagates from a not-illustrated lens assembly to a not-illustrated infrared detector. The path 291 extends approximately parallel to the axis 11, and remains stationary in relation to the rotating chopper 10. As the chopper 10 rotates, the pairs of aligned openings 36–39 and 106–109 will successively become aligned with the path 291, so that radiation traveling along the path 291 will successively pass through each pair of aligned openings, and also the portion of the film 16 aligned with each pair of these openings. As this occurs, the embossed portion 206 of the film 16 will alternately move into and out of alignment with the path 291. Consequently, radiation traveling along the path 291 will be alternately subjected to diffusion which blurs it, and freedom from such diffusion and blurring.

The film 16 has a coefficient of thermal expansion (CTE) which is greater that the CTE of the plastic material used for the frame parts 12 and 14. During normal operational use, the chopper 10 may be subjected to a wide range of temperature variations. As discussed above, the film 16 is basically free to move or float within the annular space defined between the frame parts 12 and 14, subject only to cooperation between the posts 46–48 and the slots 221–223. Therefore, as the chopper 10 experiences temperature variations, the film 16 can expand and contract radially with respect to the frame parts 12 and 14, because the radial orientation of the slots 221–223 facilitates this relative movement. The cooperating posts 46–48 and slots 221–223 maintain the film 16 in the proper angular position with respect to the frame parts 12 and 14, and also maintain the film 16 in a proper position of concentricity with respect to the axis of rotation 11. As a result, the differing CTEs of the film 16 and the frame parts 12 and 14 do not cause the film 16 to be subjected to any thermally-induced stresses. Accordingly, the film 16 will have a relatively long operational lifetime under normal operational conditions, despite any temperature fluctuations that may occur.

The present invention provides a number of technical advantages. One such advantage results from the provision of a film within a frame in a manner so that the film is free to expand and contract with respect to the frame in response to temperatures variations, without generation of stresses within the film. A further advantage is realized where the material of the film is a polymer material having polymer chains with a high degree of orientation, so to impart a greater degree of stiffness to the film than would be the case if the polymer chains had a generally random orientation.

Although one selected embodiment has been illustrated and described in detail, it will be understood that substitutions and alterations are possible without departing from the spirit and scope of the present invention, as defined by the following claims.

What is claimed is:

1. An apparatus comprising a chopper which includes:
    a frame having a first coefficient of thermal expansion, having a space therein, and having at least one opening which allows radiation to pass through said space in a first direction;
    a sheet having a second coefficient of thermal expansion different from said first coefficient of thermal expansion, said sheet being movably disposed within said space in said frame, in a manner so that said sheet can expand and contract relative to said frame in a second direction approximately parallel to said sheet and approximately perpendicular to said first direction, said frame preventing significant movement of said sheet parallel to said first direction with respect to said frame, and said sheet including structure which influences radiation that passes through said sheet in said first direction;
    wherein said sheet and said frame have cooperating features that maintain said sheet in angular and radial alignment with respect to said frame.

2. An apparatus according to claim 1, wherein said chopper has an axis extending approximately parallel to said first direction; wherein said sheet has a plurality of slots at angularly spaced locations around said axis, said slots each extending approximately radially of said axis; and wherein said frame has a plurality of pins extending through said space approximately parallel to said first direction, each said pin extending through a respective said slot.

3. An apparatus according to claim 2, wherein said sheet is free of constraint to said frame in the region of a perimeter of said sheet.

4. An apparatus according to claim 2, wherein said frame includes first and second frame parts which are coupled to each other, said space being disposed between said first and second frame parts, said frame having structure which maintains a predetermined distance between said first and second frame parts within said space, and said predetermined distance being greater than a thickness of said sheet.

5. An apparatus according to claim 4, wherein said structure of said frame includes a plurality of angularly spaced portions on one of said first and second frame parts which each engage the other of said frame parts.

6. An apparatus according to claim 5, wherein said sheet has a plurality of recesses which each receive and are oversized with respect to a respective said angularly spaced portion.

7. An apparatus according to claim 5, wherein the other of said first and second frame parts includes a plurality of angularly spaced recesses which each receive part of a respective one of said angularly spaced portions.

8. An apparatus according to claim 1, wherein said sheet is made of a polyethylene material having a high degree of orientation of the polymer chains therein.

9. An apparatus according to claim 1, wherein said structure of said sheet includes diffusing structure which diffuses radiation which passes therethrough in said first direction.

10. An apparatus according to claim 9, wherein said diffusing structure has opposite edges which each define a respective Archimedes spiral.

11. An apparatus according to claim 9, wherein said diffusing structure is configured to diffuse infrared radiation.

12. A method, comprising:
    providing a frame which has a first coefficient of thermal expansion, which has a space therein, and which has at least one opening that allows radiation to pass through said space in a first direction;
    providing a sheet which has a second coefficient of thermal expansion different from said first coefficient of thermal expansion, and which includes structure that influences radiation which passes through said sheet in said first direction; and
    responding to temperature changes by causing said sheet to undergo at least one of expansion and contraction relative to said frame within said space in a second direction approximately parallel to said sheet and approximately perpendicular to said first direction, said frame preventing significant movement of said sheet parallel to said first direction with respect to said frame;
    wherein said sheet and said frame have cooperating features that maintain said sheet in angular and radial alignment with respect to said frame; and
    wherein a chopper is formed by said frame and said sheet.

13. A method according to claim 12, wherein said chopper has an axis extending approximately parallel to said first direction; including configuring said sheet to have a plurality of slots at angularly spaced locations around said axis, said slots each extending approximately radially of said axis; and including configuring said frame to have a plurality of pins extending through said space approximately parallel to said first direction, each said pin extending through a respective said slot.

14. A method according to claim 13, including omitting constraint between said sheet and said frame in the region of a perimeter of said sheet.

15. A method according to claim 12, including selecting for the material of said sheet a polyethylene material having a high degree of orientation of the polymer chains therein.

16. A method according to claim 12, including configuring said sheet to have diffusing structure which diffuses radiation that passes therethrough in said first direction.

17. A method according to claim 16, including configuring said diffusing structure to have opposite edges which each define a respective Archimedes spiral.

18. A method according to claim 16, including configuring said diffusing structure so that it effects diffusion of infrared radiation.

19. An apparatus comprising a chopper which includes:
a frame having a first coefficient of thermal expansion, having a space therein, and having at least one opening which allows radiation to pass through said space in a first direction;
a sheet having a second coefficient of thermal expansion different from said first coefficient of thermal expansion, said sheet being movably disposed within said space in said frame, in a manner so that said sheet can expand and contract relative to said frame in a second direction approximately parallel to said sheet and approximately perpendicular to said first direction, said frame preventing significant movement of said sheet parallel to said first direction with respect to said frame, and said sheet including structure which influences radiation that passes through said sheet in said first direction;
wherein said chopper has an axis extending approximately parallel to said first direction;
wherein said sheet has a plurality of slots at angularly spaced locations around said axis, said slots each extending approximately radially of said axis; and
wherein said frame has a plurality of pins extending through said space approximately parallel to said first direction, each said pin extending through a respective said slot.

20. An apparatus according to claim 19, wherein said sheet is free of constraint to said frame in the region of a perimeter of said sheet.

21. An apparatus according to claim 19, wherein said frame includes first and second frame parts which are coupled to each other, said space being disposed between said first and second frame parts, said frame having structure which maintains a predetermined distance between said first and second frame parts within said space, and said predetermined distance being greater than a thickness of said sheet.

22. An apparatus according to claim 21, wherein said structure of said frame includes a plurality of angularly spaced portions on one of said first and second frame parts which each engage the other of said frame parts.

23. An apparatus according to claim 22, wherein said sheet has a plurality of recesses which each receive and are oversized with respect to a respective said angularly spaced portion.

24. An apparatus according to claim 22, wherein the other of said first and second frame parts includes a plurality of angularly spaced recesses which each receive part of a respective one of said angularly spaced portions.

25. A method, comprising:
providing a frame which has a first coefficient of thermal expansion, which has a space therein, and which has at least one opening that allows radiation to pass through said space in a first direction;
providing a sheet which has a second coefficient of thermal expansion different from said first coefficient of thermal expansion, and which includes structure that influences radiation which passes through said sheet in said first direction; and
responding to temperature changes by causing said sheet to undergo at least one of expansion and contraction relative to said frame within said space in a second direction approximately parallel to said sheet and approximately perpendicular to said first direction, said frame preventing significant movement of said sheet parallel to said first direction with respect to said frame;
wherein a chopper is formed, which has an axis extending approximately parallel to said first direction;
said method further including configuring said sheet to have a plurality of slots at angularly spaced locations around said axis, said slots each extending approximately radially of said axis; and
including configuring said frame to have a plurality of pins extending through said space approximately parallel to said first direction, each said pin extending through a respective said slot.

26. A method according to claim 25, including omitting constraint between said sheet and said frame in the region of a perimeter of said sheet.

27. A method, comprising:
providing a frame which has a first coefficient of thermal expansion, which has a space therein, and which has at least one opening that allows radiation to pass through said space in a first direction;
providing a sheet which has a second coefficient of thermal expansion different from said first coefficient of thermal expansion, and which includes structure that influences radiation which passes through said sheet in said first direction, said frame and said sheet forming a chopper having an axis extending approximately parallel to said first direction;
rotating said chopper about said axis and maintaining said sheet in angular and radial alignment with respect to said frame; and
responding to temperature changes by causing said sheet to undergo at least one of expansion and contraction relative to said frame within said space in a second direction approximately parallel to said sheet and approximately perpendicular to said first direction, said frame preventing significant movement of said sheet parallel to said first direction with respect to said frame.

28. A method according to claim 27, further comprising rotating said chopper about said axis and maintaining said sheet in angular and radial alignment with respect to said frame and in position of concentricity with respect to the axis of rotation.

29. An apparatus comprising a chopper which includes:
a frame having a first coefficient of thermal expansion, having a space therein, and having at least one opening which allows radiation to pass through said space in a first direction;
a sheet having a second coefficient of thermal expansion different from said first coefficient of thermal expansion, said sheet being movably disposed within said space in said frame, in a manner so that said sheet can expand and contract relative to said frame in a second direction approximately parallel to said sheet and approximately perpendicular to said first direction, said frame preventing significant movement of said sheet parallel to said first direction with respect to said frame, and said sheet including structure which influences radiation that passes through said sheet in said first direction;

wherein said chopper has an axis extending approximately parallel to said first direction; and wherein said chopper is configured to rotate about said axis and wherein said sheet and frame are configured so that said sheet is maintained in angular and radial alignment with respect to said frame.

30. An apparatus according to claim 19, wherein said chopper is configured to rotate about said axis and wherein said sheet and frame are configured so that said sheet is maintained in angular and radial alignment with respect to said frame and in position of concentricity with respect to the axis of rotation.

* * * * *